Figure 1:
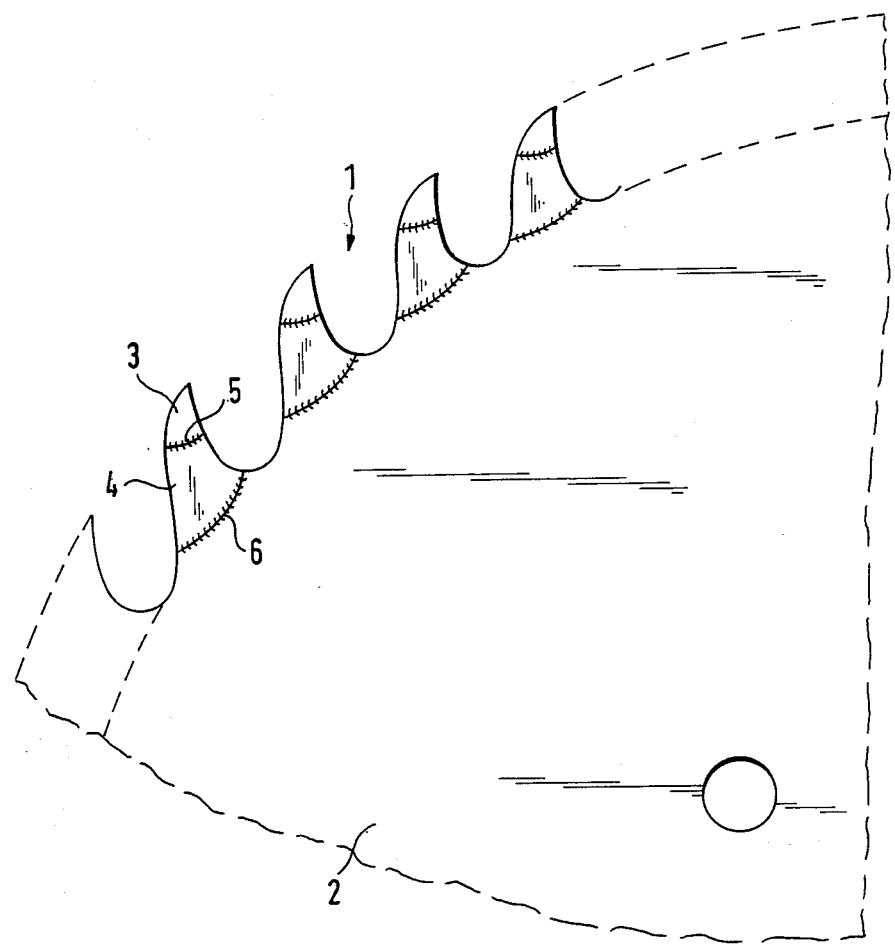

United States Patent [19]

Werz

[11] Patent Number: 4,911,037
[45] Date of Patent: Mar. 27, 1990

[54] METHOD OF MOUNTING CUTTERS OR THE LIKE OF HIGH-ALLOY TOOL STEEL ON A TOOL SUPPORTING MEMBER, AND TOOLS MADE IN ACCORDANCE WITH THIS METHOD

[75] Inventor: Bernhard Werz, Trochtelfingen, Fed. Rep. of Germany

[73] Assignee: Gustav Wagner Maschinenfabrik GmbH & Co. KG, Reutlingen, Fed. Rep. of Germany

[21] Appl. No.: 269,914

[22] Filed: Nov. 10, 1988

[30] Foreign Application Priority Data

Nov. 12, 1987 [DE] Fed. Rep. of Germany ....... 3738492

[51] Int. Cl.⁴ .............................................. B23D 63/00
[52] U.S. Cl. ......................................... 76/112; 83/835
[58] Field of Search .......... 76/112, DIG. 2, DIG. 11, 76/101 R, 101 A; 83/835

[56] References Cited

U.S. PATENT DOCUMENTS

| | | | |
|---|---|---|---|
| 3,034,379 | 5/1962 | Bernstein et al. | 76/112 |
| 3,104,562 | 9/1963 | Kolesh | 76/112 |
| 3,133,533 | 5/1964 | Sprague | 76/112 |
| 3,358,346 | 12/1967 | Samuelson | 76/112 |
| 3,991,930 | 11/1976 | Ekerot | 76/112 |
| 4,144,777 | 3/1979 | Nystrom et al. | 76/112 |
| 4,462,293 | 7/1984 | Gunzner | 76/112 |
| 4,727,778 | 3/1988 | Omi | 76/112 |
| 4,784,033 | 11/1988 | Hayden et al. | 76/112 |

Primary Examiner—Frank T. Yost
Assistant Examiner—Scott A. Smith
Attorney, Agent, or Firm—Burgess, Ryan & Wayne

[57] ABSTRACT

A method of mounting cutters (3) or the like of high-alloy tool steel on a tool supporting member of metallic material, especially on the master disk (2) of a circular saw blade (1) or the supporting band of a ribbon for a band saw, by providing intermediate pieces between supporting member and cutters, in which the cutters (3) of high-alloy tool steel are initially welded individually and in soft or non-hardened condition onto an intermediate piece (4), and in which subsequently the intermediate piece (4) including the cutter (3) is subjected to heat treatment to harden the cutter (3) and simultaneously temper the intermediate piece (4), whereafter the intermediate piece (4) with the cutter (3) is welded onto the supporting member (2). Tools made in accordance with such a method are therefore distinguished by cutters (3), of high-alloy tool steel which are welded via an intermediate piece (4) to a tool supporting member (e.g. the master disk (2) of a circular saw blade (1)).

2 Claims, 1 Drawing Sheet

METHOD OF MOUNTING CUTTERS OR THE LIKE OF HIGH-ALLOY TOOL STEEL ON A TOOL SUPPORTING MEMBER, AND TOOLS MADE IN ACCORDANCE WITH THIS METHOD

The present invention is directed to a method of mounting cutters or the like of high-alloy tool steel on a tool supporting member as specified in the preamble of claim 1, and to a tool which is preferably made in accordance with the method.

DE-A-228,860 discloses saw blades having welded teeth or a welded cutting rim of high-speed steel, in which intermediate pieces of any desired weldable metal are disposed between cutting rim and master blade or hub. The intermediate pieces are circumferentially spaced relative to each other so that they can expand freely during welding. In this way the stresses occurring during welding are to be reduced. Due to the division of the cutting rim into discrete segments the desired stress reduction is limited, however. Evidently, this is the reason why after completion of the saw blade the blade or its teeth are tempered, such tempering being performed by heating every single tooth in an oxyhydrogen blow pipe and subsequently cooling it in an air stream. Thereby the cracks and distortions caused by welding are to be prevented.

In DE-A-2,739,346 it is proposed for the purpose of preventing brittle fracture on welded circular saw blades that these should be composed of three mutually concentric zones made from different materials. The outermost zone, in which the teeth are disposed, is made from high-speed, the middle zone is made from a high-toughness steel, while the innermost zone is made from a tool steel, for instance a chromium or vanadium-alloy steel of such a structure that high hardness as well as high toughness are achieved during the tempering treatment required to achieve maximum wear resistance of the high-speed steel. The middle zone is required to have such a structure, e.g. high-nickel austenitic steel, that carbon diffusion from the innermost zone towards the high-speed steel in the outermost zone can be prevented. Instead of austenitic steel the middle zone may also be made from a suitable grade tool steel having a higher carbon content than the austenitic steel. To prevent the diffusion of carbon from the middle zone towards the outermost zone, joining is preferably performed by electron beam welding.

In practical use this method has not been successful, all the more as the outermost and the middle zone are initially made as an elongated strip and must be given annular shape after welding, whereupon joining to the innermost zone, i.e. the master disk, is effected.

The procedure adopted in practise in connection with larger-diameter circular saw blades is therefore different:

Ring segments of high-alloy tool steel are joined by riveting to a master disk of tempered steel along the circumference thereof. This method requires a lot of material and is expensive in respect of design and manufacture due to the preferred tongue-and-groove joint between the master blade and the ring segments of high-alloy tool steel. On account of this tongue-and-groove joint a circular saw blade made in this way will be relatively thick with a corresponding width of cut and correspondingly high cutting waste.

Circular saw blades of high-alloy tool steel having a smaller diameter are made completely from the expensive high-alloy tool steel due to the mentioned difficulties, which is likewise unsatisfactory.

Finally, it has already been proposed to braze cutters or teeth of high-alloy tool steel direct to the circumference of a master disk of tempered low-carbon steel. But since the brazing temperature exceeds the tempering temperature of the cutters or teeth of high-alloy tool steel, an unacceptable hardness reduction at the cutters or teeth was unavoidable. It has also been proposed to join the teeth of high-alloy tool steel direct to the master disk by resistance welding, whereby cracks on the hardened cutters of high-alloy tool steel were also caused. Due to the welding operation new hardness zone of extreme brittleness is formed in the high-speed steel. This is why a properly functioning joint between cutters of high-alloy tool steel and the master disk of a circular saw blade or the ribbon of a bandsaw cannot be made in this way.

It is therefore the object of the present invention to provide a method of the above-specified kind by which a permanently firm joint between cutters of high-alloy tool steel and a tool supporting ember of metallic material can be made in a simple way. It is a further object to provide a correspondingly designed tool.

A method of mounting cutters of high-alloy tool steel on a tool supporting member of metallic materail which comprises: (1) welding cutters of hardenable high-alloy tool steel, in a non-hardened condition, to a temperable intermediate piece to form acutter assembly; (2) heat treating the cutter assembly to harden the cutter and temper the intermediate piece; (3) welding the cutter assemlby to the supporting member. The tool is particularly strong when the intermediate piece is made from a tempered low carbon steel.

The gist of the present invention resides in that the cutters of high-alloy tool steel are initially welded to an intermediate piece while they are still in a soft or non-hardened condition, whereupon the intermediate piece including the cutter is subjected to heat treatment whereby the cutter is hardened and at the same time the intermediate piece is tempered. Subsequently, the assembly composed of "intermediate piece and cutter" can be welded to the supporting member without any difficulties while the hardness of the cutter or the like of high-alloy tool steel is not affected.

The invention provides for a considerable saving of the expensive high-alloy tool steel used as cutting material. The use of the intermediate piece provides for high safety of the joint. The transition between cutter and supporting member is sufficiently tough. With the invention it is possible to produce relatively narrow circular saw blades or bandsaw ribbons having a correspondly small cutting width, whereby cutting waste is minimized correspondingly.

The assembly composed of "intermediate piece and cutter" can be subjected to optimum heat treatment without any effect on the tool supporting member. It is easy to make the joint between cutting material and intermediate piece, on the one hand, and between intermediate piece and tool supporting member, on the other hand. No additional materials are required to this end. Preferably, the joint is made by resistance welding.

The assembly composed of "intermediate piece and cutter" is readily replaceable by the user of the tool upon excessive wear or damage. It is merely necessary to weld a fresh assembly to the tool supporting member. An additional heat treatment by the user of the kind provided, for instance, by the method of DE-A-228,860 is not required.

The mentioned weld joints between cutter and intermediate piece, on the one hand, and intermediate piece and tool supporting member, on the other hand, are preferably made by resistance, laser beam, electron beam, plasma welding or any other welding process in which a narrow weld with a small heating zone is provided.

Preferably, the intermediate piece consists of a low-carbon steel, especially one having a carbon content of less than 0,45%. The supporting member is preferably made from a similar or the same material. But it may as well consist of conventional tool steel because the weld between the intermediate piece and the supporting member is not critical.

The assembly of "intermediate piece and cutter" is manufactured by using a soft cutter of high-alloy tool steel, i.e. a cutter having a Brinell hardness of about 230 to 290 HB.

The weld wherein the intermediate piece is joined to the supporting member by a weld which is concavely curved as viewed from the intermediate piece is distinguished by especially high strength.

Basically, it is also conceivable to use a common intermediate piece of the kind proposed by the invention for two or three adjacent cutters of high-alloy tool steel. But such an embodiment exhibits a disadvantage for example in respect of the replacement of individual damaged cutters of high-alloy tool steel. Also, improved matching with the dimensions of the tool supporting member would be necessary.

Below, a circular saw blade manufactured in accordance with the present method is described in detail with reference to the accompanying drawing.

The drawing is a schematic side view of part of a circular saw blade 1 made in accordance with the invention and comprising a master disk 2 to the circumference of which cutters 3 of high-alloy tool steel are welded through the intermediary of an intermediate piece 4. The cutter s 3 of high-alloy tool steel and the intermediate pieces 4 have a thickness which corresponds approximately to that of the master disk 2. Joining of the cutters 3 of high-alloy tool steel with the intermediate pieces 4 and of the intermediate pieces 4 with the master disk 2 is respectively effected by resistance welding (welds 5 and 6). Each intermediate piece 4 is made from a low-carbon steel, especially one having a carbon content of less than 0.45%. The master disk 2 is preferably made from the same material as the intermediate pieces 4. The described circular saw blade 1 is produced as follows:

Initially, each of the cutters 3 of high-alloy tool steel is welded individually and in soft or non-hardened condition (Brinell hardness 230 to 290 HB) to an intermediate piece 4. Then, the intermediate piece including the cutter is subjected to heat treatment whereby the cutter 3 is hardened while the intermediate piece 4 is tempered simultaneously. Then, the intermediate piece 4 including the cutter 3 is welded onto the master disk 2 along the circumference thereof. The cutter 3 of high-alloy tool steel is joined to the master disk in tough-elastic fashion. The weld 6 between the intermediate piece 4 and the master disk 2 is concavely curved, as viewed from the intermediate piece 4. Basically, a convexly curved weld is also conceivable. This provides for especially high strength of the joint between intermediate piece 4 and master disk 2. The weld 5 between the cutter 3 of high-alloy tool steel and the intermediate piece 4 is similarly curved. Preferably, the length of the intermediate piece 4 is approximately twice the length of the cutter 3 of high-alloy tool steel. This ensures a sufficiently tough-elastic transition between cutter 3 of high-alloy tool steel and master disk 2.

In the same way a ribbon for a bandsaw can be manufactured. As an alternative, it would be conceivable to weld cutter s 3 of high-alloy tool steel in soft state, i.e. in non-hardened state, direct to the master disk 2 and to subsequently conduct a segment-wise heat treatment, preferably from one tooth to the next. In this case it would be recommended to inductively heat each cutter or tooth of high-alloy tool steel to about 1200° C., subsequently to cool with air, and thereafter to conduct at least two tempering operations. During tempering the cutters or teeth of high-alloy tool steel are respectively heated to about 550° C. Intermediate the two tempering steps atmospheric cooling to less than 100° C. is carried out. Tempering is again effected inductively and is limited to the cutters or teeth of high-alloy tool steel, since the tempering temperature is above the hardening temperature of the master disk.

This method requires a manufacturing time of about 18 to 20 minutes for each tooth; it is therefore considerably more expensive than the initially described method, in which an intermediate piece is provided between the cutters of high-alloy tool steel and he master disk. Furthermore, the last-mentioned method does not permit any repair of the circular saw blade or of a correspondingly made ribbon on the user's side, because the user normally is not equipped with the means for performing the described heat treatment of the cutters or teeth.

It should be noted again that hardening of cutters of high-alloy tool steel, which have been welded in the soft state, together with the master disk is impossible. In that case the master disk would also have to be heated to about 1200° C. Such a treatment would result in an unacceptable distortion of the master disk so that it would become useless.

Hence, the above-described and proven particularly advantageous, and the last-mentioned procedure including tooth-by-tooth hardening, though exhibiting certain drawbacks, is indeed a practicable alternative.

All of the features disclosed in the present papers are claimed as being essential for the invention to the extent to which they are novel over the prior art either individually or in combination.

I claim:

1. A method of mounting cutters of high-alloy tool steel on a support member of metallic material, to form a saw blade, comprising the steps of:
  (1) welding cutters of hardenable high-alloy tool steel, in a non-hardened condition, to a temperable low carbon steel intermediate piece with a carbon content of less than 0.45%, to form a cutter assembly;
  (2) heat treating the cutter assembly to harden the cutters and temper the intermediate piece;
  (3) welding the cutter assembly to the support member.

2. A method of claim 11 wherein each of the welding steps (1) and (3) includes the step of welding by a method selected from the group consisting of resistance welding, electron beam welding, laser beam welding and plasma welding.

* * * * *